United States Patent Office 2,766,127
Patented Oct. 9, 1956

2,766,127

ANTI-MISTING PRINTING INKS

Andries Voet and Ira Williams, Borger, Tex., assignors to J. M. Huber Corporation, Borger, Tex., a corporation of New Jersey No Drawing. Application March 13, 1953,
Serial No. 342,290

14 Claims. (Cl. 106—27)

This invention relates to printing inks having valuable anti-misting properties and to methods for the preparation of such printing inks.

The speed of printing presses has been increased so much that web speeds of 1200 ft. per min. or more are common practice. The high speed has caused an increasing nuisance in the press room from ink which leaves the running presses in the form of a very fine mist. This ink mist contaminates everything in the press room, causing spoilage of material and great expense for continually cleaning the entire room and contents. In extreme cases the mist near the press is sufficient to constitute a fire hazard.

Attempts to alleviate this problem have previously been directed toward methods of collecting the mists by means of adequate ventilating equipment and means for filtering and removing the suspended ink from the air stream before it is discharged to the outside atmosphere. Such methods have proven to be costly, inefficient and difficult to operate.

The purpose of this invention is to provide new and improved printing inks and, more particularly, to provide printing inks which will operate on high speed presses with little or no misting. A further object is to provide a method for the preparation of substantially non-misting or press resident printing inks.

According to the present invention, it has been found that these objects can be accomplished by incorporating swollen bentonite in a finely divided state into printing inks suitable for high speed printing. Although the misting properties of such a printing ink are not reduced by the introduction of finely divided bentonite in its common commercial form, we have discovered that a great reduction of misting properties is obtained when the ink is made to contain well dispersed fine particles of swollen bentonite. Bentonite swollen to three or more times its normal dry volume is effective for this purpose.

One way of preparing anti-misting inks according to this invention is to treat a finely divided swellable bentonite with a liquid that swells it, until the bentonite is swollen to the desired extent, and then disperse the swollen bentonite through a normal printing ink or through the vehicle to be used for preparing the desired ink. Another way giving important advantages is to disperse the finely divided swellable bentonite in a normal printing ink either before or after evenly incorporating such a liquid into the ink, the most effective practice being to incorporate the bentonite-swelling liquid before adding the bentonite. In either case the ink is stirred or agitated as the later addition is made and until the added liquid is absorbed by the bentonite and swollen finely divided bentonite is well dispersed through the ink.

The common commercial form of finely divided bentonite is swellable by contact with liquids which have a very high dielectric constant, such as water or formamide. It also is swellable by solutions of solids having a high dielectric constant, for example N methyl acetamide. Solutions of such solids in either water or formamide are useful with bentonite according to this invention; but water preferably is used alone because of its satisfactory action and its low cost. Formamide is substantially equivalent to water for this purpose, except in cost.

The inks used for high speed printing have water-immiscible liquid vehicles. To render them anti-misting according to preferred embodiments of this invention, water in a quantity sufficient to form the desired swollen bentonite is first dispersed through the ink, preferably with the acid of a suitable dispersing or emulsifying agent, after which finely divided dry bentonite or a dispersion of finely divided bentonite in part of the vehicle of the final ink is stirred into the ink containing the dispersed water.

According to another practice, finely divided bentonite is first dispersed through the ink, after which water is emulsified in the ink and the material is slowly agitated until all the water is absorbed by the bentonite.

In still another practice, finely divided bentonite may be treated with water vapor or steam until it has absorbed up to several times its weight of water. The swollen bentonite thus obtained is dispersible in printing ink and can be ground into the ink vehicle in any conventional manner.

The bentonites useful according to this invention are all of the swelling type but may vary considerably in chemical composition. In general, they are montmorillonitic minerals of which the principal constituent is montmorillonite, this constituent being responsible for their ability to swell and usually being present in association with sodium. Their composition, however, may vary considerably and may even contain considerable amounts of such substances as calcium and magnesium. Suitable materials have the property of being swellable by water to at least about three times their normal dry volume. They are typified by Wyoming bentonites and similar materials, among which are finely divided products available under the trade names Aquagel, BC Volclay, National Standard Bentonite, Magcogel and Control Gel. As here used these materials preferably consist predominately of particles smaller than 300 mesh.

Printing inks made according to this invention show a marked reduction of misting tendencies when thier content of dispersed swollen bentonite, calculated on the normal dry weight of the bentonite, is as little as 2 percent of the weight of the ink. The full mist inhibiting effect is obtained with about 4 percent to 6 percent of bentonite. The use of larger amounts is not harmful as long as the required flow quality or body of the ink is preserved.

The misting properties of inks may be tested in the following manner. Two independently driven horizontal steel rollers 2.5 inches in diameter by 6 inches long are rotated toward one another so that the motion between the two rollers is downward. One roller is provided with a slow endwise oscillating motion of 0.5 inch to maintain distribution of the ink on the rollers. One and one-half grams of ink are placed on the rollers with the distance between the rollers adjusted so that both rollers contact the film of ink between them. The rollers are then rotated at 1200 R. P. M. with a weighed piece of aluminum foil 3 inches square placed centrally three inches below the rollers. After three minutes the aluminum foil is removed and weighed to determine the amount of ink mist which has deposited. Results obtained with this instrument have been found to correspond with tests of the same inks which were run on high speed presses in actual production.

The practice of this invention is further illustrated by the following examples. In these examples parts are given by weight, and misting properties were determined by the test prescribed above.

Example 1

A standard black news ink was prepared in the proportion of 87 parts of mineral oil, 12 parts of channel black and 1 part of gilsonite by mixing on a three roller mill. One hundred grams of this black ink were treated with one gram of lecithin to act as a dispersing agent, followed by the addition of 15 grams of water. The ink was strongly agitated until the water was well dispersed, and while the stirring was continued 6 grams of 325 mesh Wyoming bentonite was sifted into the ink. The ink was then stirred slowly to permit the bentonite to absorb the dispersed water. This method provides a relatively uniform distribution of the water among the particles of bentonite. The inks were then permitted to age for 18 hours, whereupon the misting tendency of each was determined by the prescribed test. The untreated ink misted 53 milligrams while the treated ink misted only 11 milligrams.

Example 2

To 100 parts of the standard black news ink of Example 1, 10 parts of bentonite and 1 part of octadecylamine, a dispersing agent, were added. The mixture was thoroughly agitated by means of an electric stirrer. 100 gram portions of this ink were then treated with varying amounts of water. The inks were aged for 24 hours and the misting tendency was determined with the following results.

| Grams of Water added | 0 | 2½ | 5 | 10 | 20 |
|---|---|---|---|---|---|
| Milligrams of Mist | 51 | 36 | 24 | 11 | 3 |

Example 3

A colored news ink was prepared by incorporating 12 grams of lithol red pigment into 88 grams of a mineral oil containing 10 percent of limed resin, these ingredients being ground together on a three roller mill. Swollen bentonite was prepared by mixing 16 grams of bentonite and 80 grams of water. 25 parts of this swollen bentonite were roughly incorporated into 100 parts of the colored ink and the dispersion was completed on a three roller mill.

The bentonite free ink misted 37 milligrams in 3 minutes while the ink containing the swollen bentonite gel misted only 3 milligrams.

Example 4

A heat set ink was prepared by incorporating 15 grams of furnace black into a heat set vehicle consisting of 60 parts of a zincated rosin and 40 parts of a mineral solvent of a boiling range between 205–235° C. 100 grams of this ink were treated with 1 gram of sorbitol monolaurate as an emulsifying agent, and 15 grams of water were emulsified into the ink by vigorous agitation. 7½ grams of finely powdered bentonite were then stirred into the emulsion and the mixture was passed over a three roller mill.

The misting tendencies of the inks were determined after 24 hours. The water and bentonite free ink misted 39 milligrams while the ink containing the swollen bentonite misted 4 milligrams.

It will be understood that the details and examples set forth hereinabove are illustrative and that the invention herein disclosed may be practiced in various other ways without departing from the principles of the disclosure or the scope of the appended claims.

We claim:

1. An anti-misting printing ink consisting essentially of coloring matter and swollen finely divided bentonite dispersed in a liquid printing ink vehicle consisting essentially of water-immiscible liquid, the amount of said swollen bentonite being sufficient to inhibit misting of the ink on a printing press and the dry weight of said bentonite not exceeding about 6% of the weight of the ink.

2. An anti-misting printing ink consisting essentially of coloring pigment and water-swollen finely divided bentonite dispersed in a printing ink vehicle consisting essentially of water-immiscible liquid, the amount of said swollen bentonite being sufficient to inhibit misting of the ink on a printing press and the dry weight of said bentonite not exceeding about 6% of the weight of the ink.

3. An anti-misting printing ink consisting essentially of coloring pigment and water-swollen finely divided bentonite dispersed in a printing ink vehicle consisting essentially of water-immiscible liquid and containing an emulsifying agent, the amount of said swollen bentonite being sufficient to inhibit misting of the ink on a printing press and the dry weight of said bentonite not exceeding about 6% of the weight of the ink.

4. An anti-misting printing ink consisting essentially of a fluid dispersion, in a liquid printing ink vehicle consisting essentially of mineral oil, of coloring matter and a finely divided bentonite swollen by absorbed liquid to at least three times its normal volume, the amount of said swollen bentonite being sufficient to inhibit misting of the ink on a printing press and the dry weight of said bentonite not exceeding about 6% of the weight of the ink.

5. An anti-misting printing ink consisting essentially of a fluid dispersion, in a liquid printing ink vehicle consisting essentially, of mineral oil, of coloring matter and a finely divided bentonite swollen by absorbed liquid to at least three times its normal voluem, the amount of said swollen bentonite being sufficient to inhibit misting of the ink on a printing press and the dry weight of said bentonite not exceeding about 6% of the weight of the ink.

6. An anti-misting printing ink consisting essentially of a fluid dispersion, in a water-immiscible liquid printing ink vehicle consisting principally of mineral oil, of carbon black and a finely divided bentonite swollen by water to at least three times its normal volume, the amount of said swollen bentonite being sufficient to inhibit misting of the ink on a printing press and the dry weight of said bentonite not exceeding about 6% of the weight of the ink.

7. An anti-misting printing ink consisting essentially of a fluid dispersion, in a liquid printing ink vehicle consisting essentially of water-immiscible liquid of coloring matter and a finely divided bentonite swollen by formamide to at least three times its normal volume, the amount of said swollen bentonite being sufficient to inhibit misting of the ink on a printing press and the dry weight of said bentonite not exceeding about 6% of the weight of the ink.

8. An anti-misting printing ink consisting essentially of a fluid dispersion, in a printing ink vehicle consisting essentially of water immiscible liquid and containing an emulsifying agent, of coloring matter and a finely divided water-swellable montmorillonitic mineral swollen by absorbed water to at least three times its normal volume, the amount of said swollen mineral being sufficient to inhibit misting of the ink on a printing press and the dry weight of said mineral not exceeding about 6% of the weight of said ink.

9. The method of preparing an anti-misting printing ink which comprises incorporating swollen bentonite into a fluid dispersion of coloring matter in a printing ink vehicle consisting essentially of water-immiscible liquid, the amount of said swollen bentonite being sufficient to inhibit misting of the ink on a printing press and the dry weight of said bentonite not exceeding about 6% of the weight of the ink.

10. The method of preparing an anti-misting printing ink which comprises swelling a finely divided bentonite by contacting it with moisture and thereafter dispersing the swollen bentonite in a fluid dispersion of coloring matter in a printing ink vehicle consisting essentially of water-immiscible liquid, the amount of said swollen bentonite being sufficient to inhibit misting of the ink on a printing press and the dry weight of said bentonite not exceeding about 6% of the weight of the ink.

11. The method of preparing an anti-misting printing ink which comprises forming a fluid dispersion of coloring matter in a printing ink vehicle consisting essentially of water-immiscible liquid, dispersing in said dispersion liquid capable of swelling bentonite, and thereafter adding and mixing finely divided bentonite into said dispersion until the bentonite has absorbed said liquid and swollen in a dispersed state, the amount of said swollen bentonite being sufficient to inhibit misting of the ink on a printing press and the dry weight of said bentonite not exceeding about 6% of the weight of the ink.

12. A method according to claim 11, said liquid being principally water and said dispersion containing a water-in-oil emulsifying agent.

13. The method of preparing an anti-misting printing ink which comprises forming a fluid dispersion of coloring matter in a printing ink vehicle consisting essentially of water-immiscible liquid, dispersing finely divided swellable bentonite in said dispersion, and thereafter adding and mixing into said dispersion a liquid capable of swelling the bentonite until the bentonite has absorbed said liquid and swollen in a dispersed state, the amount of said swollen bentonite being sufficient to inhibit misting of the ink on a printing press and the dry weight of said bentonite not exceeding about 6% of the weight of the ink.

14. A method according to claim 13, said liquid being principally water and said dispersion containing a water-in-oil emulsifying agent.

References Cited in the file of this patent

UNITED STATES PATENTS

| | | |
|---|---|---|
| 1,550,650 | Banks | Aug. 18, 1925 |
| 1,738,967 | Sadtler | Dec. 10, 1929 |
| 1,758,145 | Clutterbuch | May 13, 1930 |
| 1,863,731 | Schorger | June 21, 1932 |
| 2,006,162 | Fuchs | June 25, 1935 |
| 2,162,059 | Chedic | June 13, 1939 |
| 2,375,752 | Clare | May 15, 1945 |
| 2,426,140 | Bollaert | Aug. 19, 1947 |

FOREIGN PATENTS

| | | |
|---|---|---|
| 826,565 | France | Apr. 4, 1938 |
| 828,699 | France | May 25, 1938 |

OTHER REFERENCES

Miscall: Chem. Met. Eng. 37 (1930).

Wolfe: "Printing and Litho Inks," pages 70, 71 and 222.

Ellis: "Printing Inks" (1940), pages 433–4.